United States Patent [19]

Gallaher, Jr.

[11] 4,252,360

[45] Feb. 24, 1981

[54] MECHANICAL HANDLING APPARATUS

[76] Inventor: John K. Gallaher, Jr., P.O. Box 10767, Salem Station, Winston-Salem, N.C. 27108

[21] Appl. No.: 48,173

[22] Filed: Jun. 12, 1979

[51] Int. Cl.³ .............................................. B66C 1/10
[52] U.S. Cl. .................................. 294/86 R; 294/116; 414/4
[58] Field of Search ................ 294/86 R, 67 BC, 88, 294/116, 106; 414/1, 2, 3, 4, 5, 6; 74/710

[56] References Cited

U.S. PATENT DOCUMENTS

| | | | |
|---|---|---|---|
| 3,388,942 | 6/1968 | Johnsson et al. ................... | 294/116 |
| 3,601,260 | 8/1971 | Le Guennec .......................... | 414/4 |
| 4,030,617 | 6/1977 | Richter .................................. | 414/4 |

Primary Examiner—James B. Marbert

[57] ABSTRACT

A lightweight, mechanical handling apparatus including a self-contained, motorized base module, a self-contained torso module, and arm modules mounted in left and right hand orientation upon the torso module. Each arm module is provided with six reversible electric motors for performing six functions. The shoulder and wrist portions of the arms are capable of 180° rotation and the upper arm, lower arm and hand portions of the arm are interconnected for pivotal movement relative to each other.

7 Claims, 15 Drawing Figures

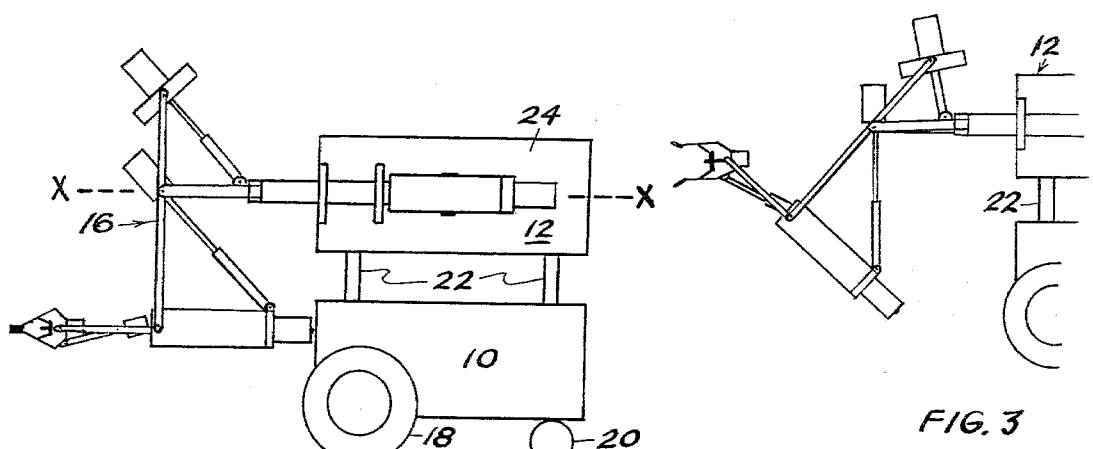
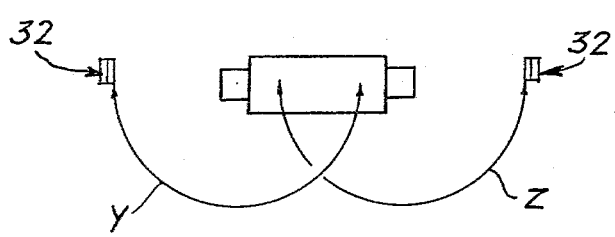
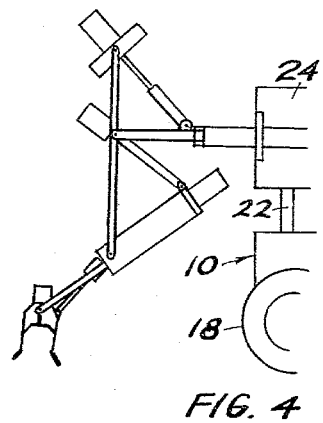
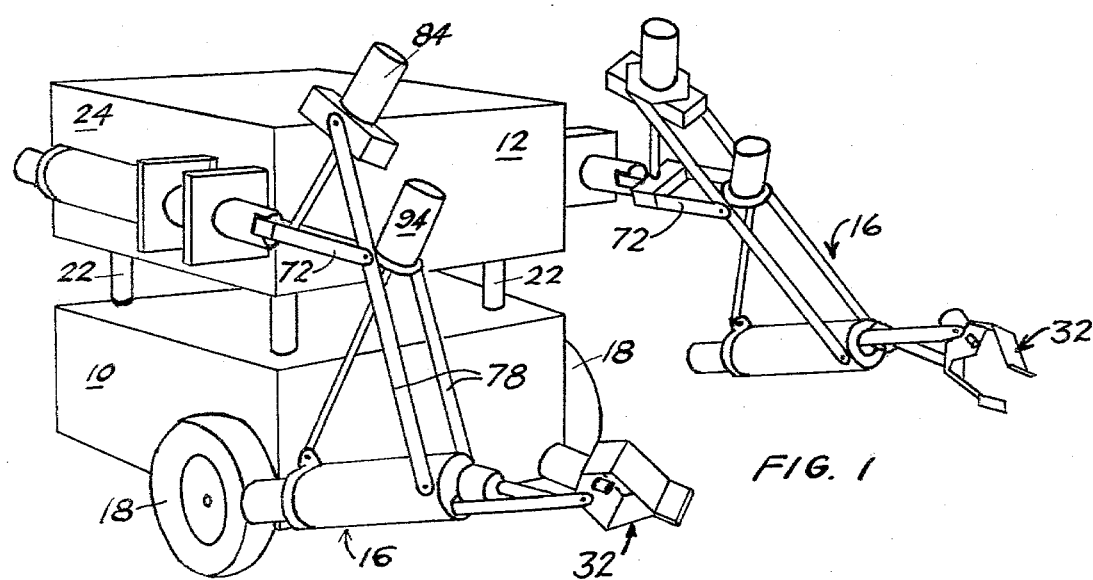

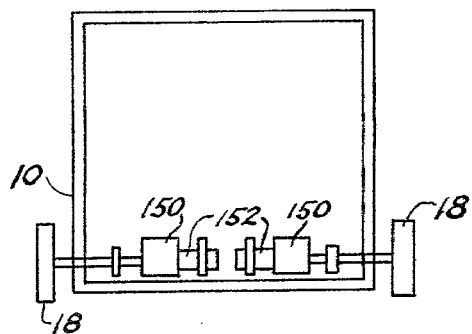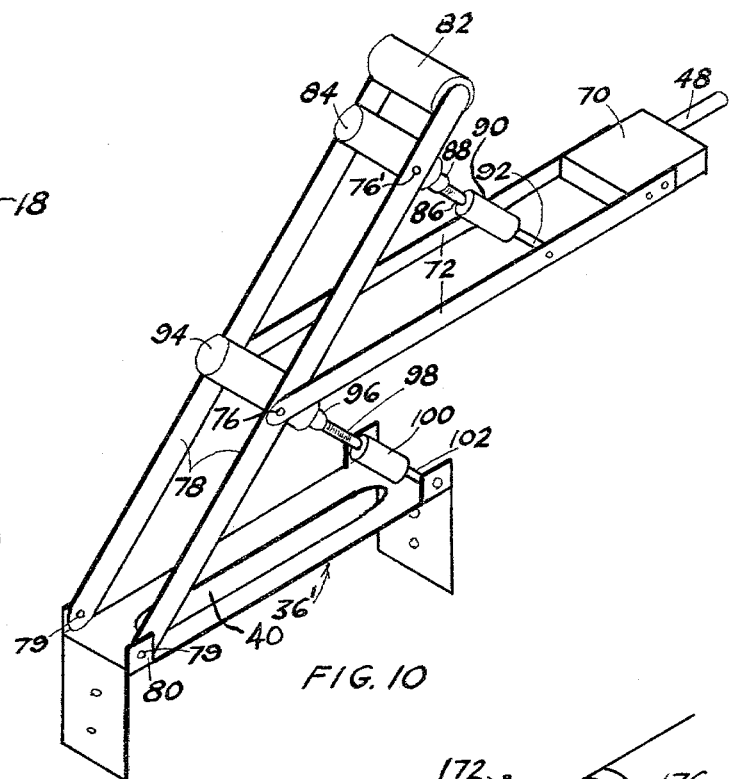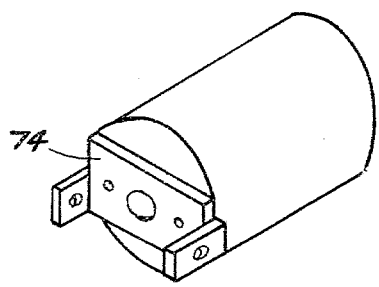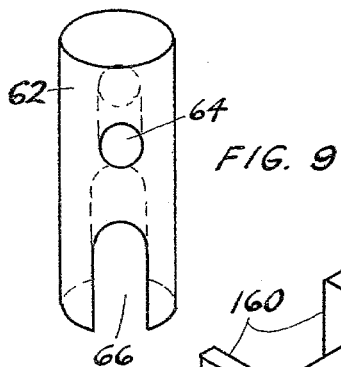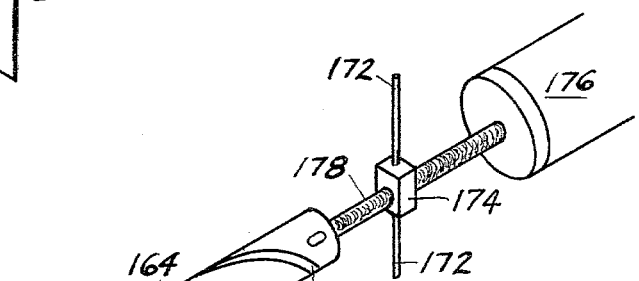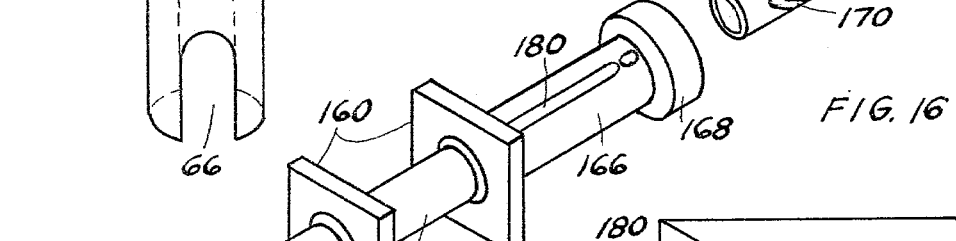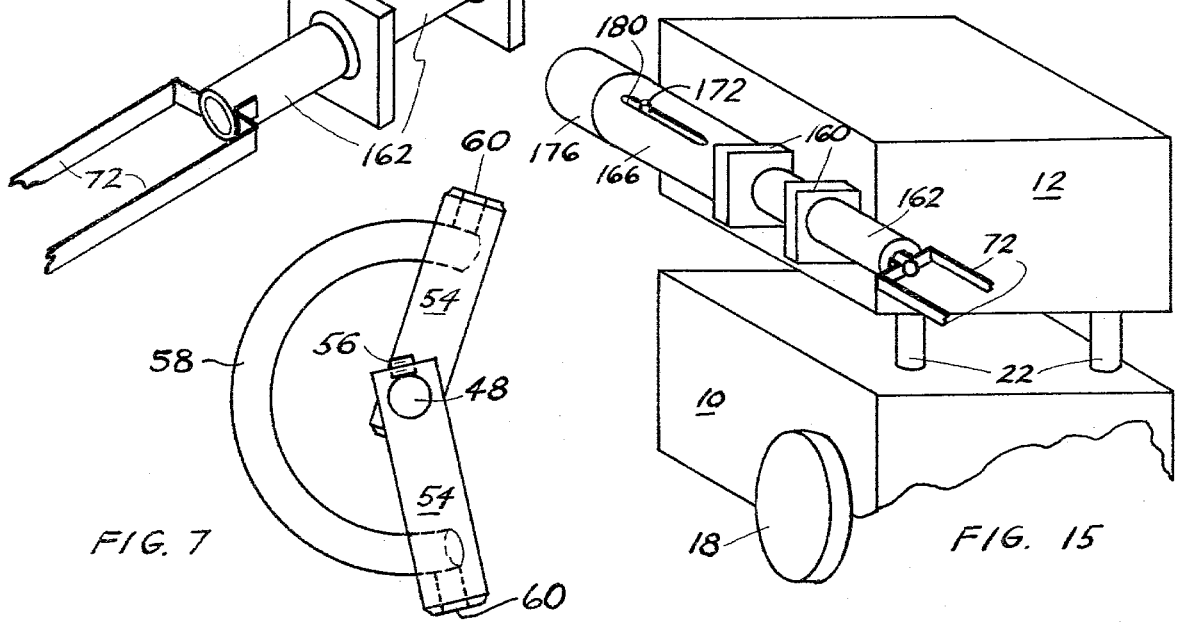

MECHANICAL HANDLING APPARATUS

BACKGROUND, BRIEF SUMMARY AND OBJECTS OF THE INVENTION

This invention relates generally to a mechanical handling apparatus, and more particularly to improvements in control actions of articulated structures.

The invention concerns improvements relating to mechanical handling apparatus in which displaceable members grip and move an object, and basically includes a motorized base module, a torso module and at least one arm module. Each module is self-contained, and in a preferred embodiment, two arm modules are mounted upon the torso in a left and right orientation.

Each of the arm modules has six motors, and therefore six functions. Motor controlled shoulder movements can swing the lower arms through 180°. Each wrist also is capable of 180° rotational movement. An upper arm motor and an elbow motor provide lift and trimming, respectively, for each arm. A hand motor is capable of tilting the fingers 45° and a finger motor is provided to actuate the fingers for gripping and moving an object about.

A unique feature of the invention permits rotational movement in the wrist and shoulder areas of each arm module thereby permitting the hands to swing in intersecting arcs for cooperation in various tasks.

The modular concept provides for many different combinations and configurations of the apparatus, other than the embodiment illustrated, thus providing great versatility. The modules are independent of one another in function. The constriction eliminates conventional gears and gearboxes, thus reducing weight as well as costs. Rotary movement of the various components is created through linear actuation.

The concept is particularly adapted for microprocessor control, which could be internally housed within the torso module. The arms may be equipped with feedback systems and manipulated through programs stored within the computer. The base module may house the computer power supply and, in addition, also may be provided with drive wheels to mobilize the complete system.

One of the primary objects of the invention is the provision of a new and improved mechanical handling apparatus.

Another object of the invention is the provision of a lightweight, versatile handling apparatus of modular construction which is compact and inexpensive.

A further object of the invention is the provision of a new and improved handling apparatus wherein rotary movements are created through linear actuation.

Other objects and advantages of the invention will become apparent from the following description taken in conjunction with the accompanying drawing.

BRIEF DESCRIPTION OF THE DRAWING

FIG. 1 is a perspective view of one embodiment of the mechanical handling apparatus of the present invention;

FIG. 2 is a schematic, fragmentary side elevational view of the mechanical handling apparatus of FIG. 1, illustrating one arm module with the fingers in a closed position;

FIG. 3 is a schematic, fragmentary, side elevational view similar to FIG. 2 with the arm and hand portions being lifted and with the fingers open;

FIG. 4 is a schematic, fragmentary, side elevational view with the arm and hand in a lowered position and also with the fingers open;

FIG. 7 is an end elevational view of the spiral of FIG. 6, taken along line 7—7 of FIG. 6;

FIG. 9 is an enlarged perspective view of an actuator member;

FIG. 10 is a fragmentary perspective view of an arm module;

FIG. 11 is a perspective view of a motor mount and motor attached thereto;

FIG. 13 is a schematic diagram illustrating the intersecting arcs of the hands of left and right oriented arm modules;

FIG. 14 is a top plan view of the base module 10, with the top or cover removed, and illustrating the driving system;

FIG. 15 is a fragmentary, perspective view of the apparatus illustrating a modified embodiment of a spiral drive for rotating an arm module; and FIG. 16 is an exploded perspective view of the spiral drive of FIG. 15.

DETAILED DESCRIPTION OF THE INVENTION

Figure 5:
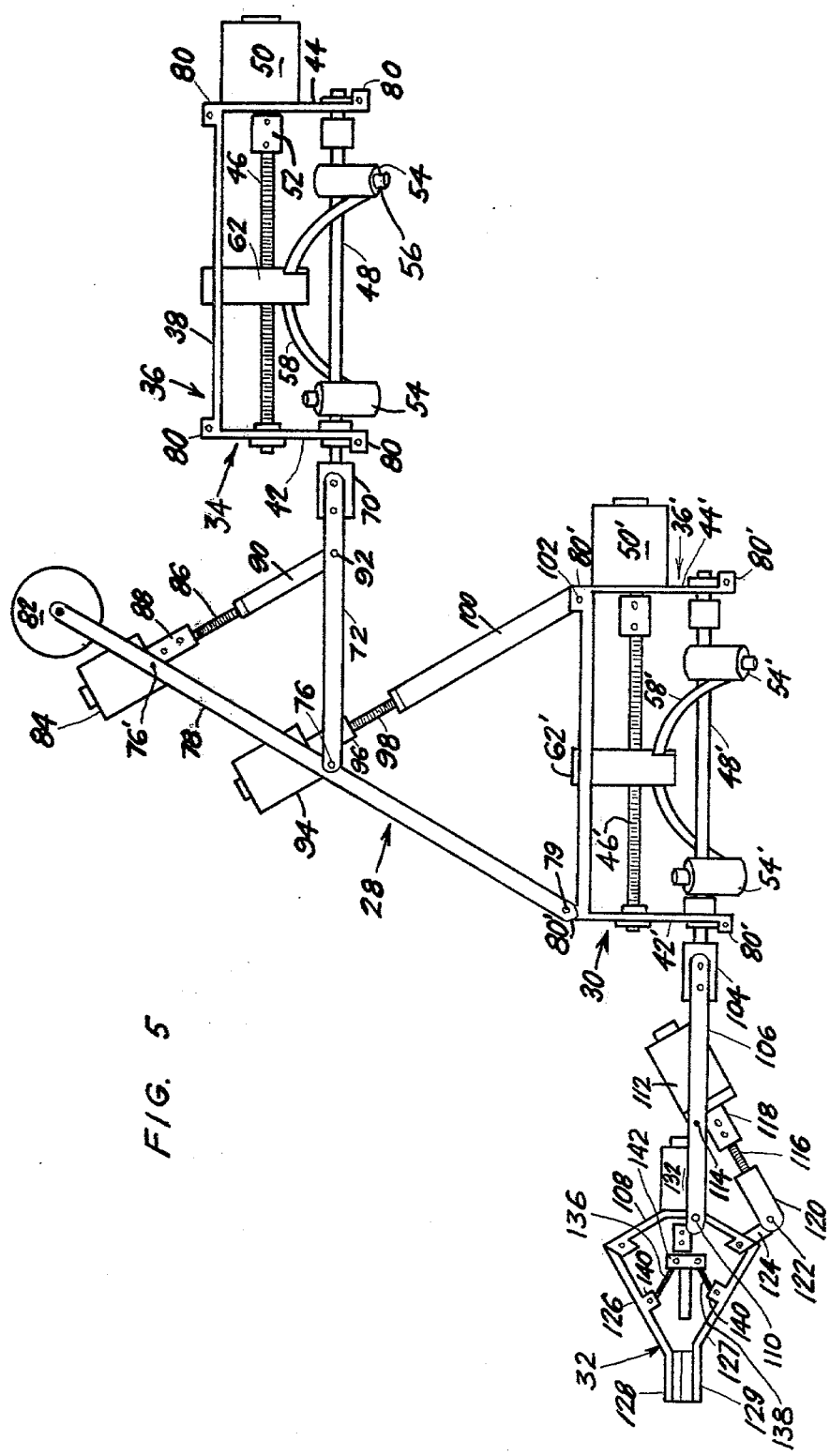
FIG. 5 is an enlarged, schematic, side elevational view of an arm module.

Referring to the drawing, and initially to FIG. 1, the mechanical handling apparatus includes a base module 10, a torso module 12 which is mounted upon the base module 10 in a conventional manner, and a pair of arm modules 16, 16 supported upon the torso.

While the embodiment illustrated in FIG. 1 will be described in detail, it is to be understood that the modular concept of the invention provides for many different configurations and combinations.

The base or lower module 10 is of box-like construction which may house a power source for various components if desired, as well as a conventional drive system for the wheels 18, 18. The conventional drive arrangement may include an electric motor, gearbox, drive shaft, etc., not shown, or other suitable systems. The rear portion of the base module 10 is supported by a caster 20.

The torso module 12 is positioned in spaced, superposed relation above the base module 10 by a plurality of support posts 22. The torso module 12 also is of a hollow, box-like construction adapted to house a computer of various other selected components or systems, as desired.

The torso and base modules 10 and 12 preferably are of lightweight construction, and may be of metal having welded sides and bottom plate, and a removable one-piece cover.

In one embodiment of the invention, two arm modules 16, 16 are supported on opposite sides 24 of the torso module 12. While the arms are mounted in right and left hand orientation, the operation of only one arm module will be described in detail.

Figure 6:
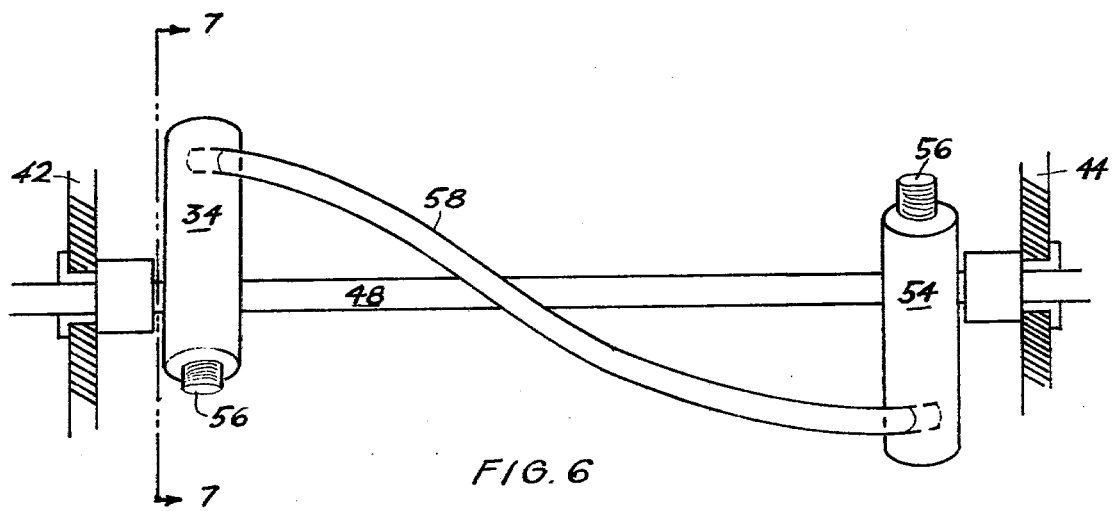
FIG. 6 is an enlarged, schematic plan view of a spiral arrangement provided at the wrist and shoulder portions of each arm module for providing rotational movement.

Referring to the embodiment of FIG. 5, each arm module 16 includes an upper arm frame 28, a lower arm frame 30 and a hand 32. The upper arm frame includes a shoulder assembly 34 for rotating the arm through approximately 180°. The assembly 34 has a frame 36 rigidly supported upon the torso module 12 by conventional means. Frame 36 has a generally horizontally disposed web section 38 provided with an elongated slot 40, as shown most clearly by FIG. 10 and generally vertically disposed, parallel web sections 42, 44 depend from the ends of section 38. The web section 38 as well as sections 42, 44 are provided with mounting brackets 80. Each of web sections 42 and 44 define pairs of aligned openings therein which are provided with brass fittings which rotatably support a threaded rod 46 and a steel shaft 48. The web section 44 serves as a mount for a reversible drive motor 50 having the drive shaft secured to an end of threaded rod 46 by means of a coupling 52. Supports 54 are rigidly attached adjacent each end of the shaft 48 by set screws 56, as shown most clearly by FIGS. 6 and 7. A spiral actuator rod or wire member 58 has end portions which extend into bores provided adjacent the outer ends of supports 54. The ends are retained within the bores of supports by set screws 60. An elongated actuator member 62, FIG. 9, is provided with a threaded opening 64 adjacent the central portion, and an elongated slot 66 at one end. The rod 46 threadably receives the actuator 62 while the slotted end 66 receives steel shaft 48. The opposite end of the actuator 62 projects through the elongated slot 40 within web section 38 of frame 36. Therefore, upon actuation of drive motor 50 and threaded rod 46 in one direction, the actuator 62 is displaced longitudinally of frame 36 thus rotating the shaft 48 in a first direction due to the curvature of the spiral wire 58. Reversing the motor rotates the shaft 48 in the opposite direction. The configuration of the spiral wire permits approximately 180° rotation of shaft 48 and the entire arm module 40 about axis X—X, FIG. 2.

The frame 36 is supported by the torso module 12. Spacers, not shown, conventional are secured to side walls of the torso module 12 and fasteners extend through one or more brackets 80 and into the spacers.

Referring to FIGS. 5, 10 and 11 block member 70, preferably of aluminum is fixedly secured to the outer end of shaft 48 and has elongated, spaced, parallel braces 72, 72 fastened to the sides thereof. The ends of braces 72, 72 opposite block member 70 are secured in spaced relation by a motor mount or bracket 74 and a conventional fastener means 76. The fastener means 76 permits pivoting of the bracket 74 relative to the braces 72, 72. A second pair of spaced, parallel braces 78, 78 are secured at approximately the midpoint inwardly of braces 72, 72 by fastener means 76 and bracket 74. The lowermost ends of braces 78, 78 are secured by fasteners 79 to brackets 80', 80' of the web section of a frame 36'.

The frame 36' is substantially identical to the frame 36 previously described and, therefore, will not be described in detail. The upper end portions of braces 78, 78 also are secured to a bracket 74 by a fastening means 76'. The upper, outermost extremeties of braces 78, 78 support a counterweight 82. The bracket 74 supports a reversible upper arm drive motor 84 which has its drive shaft secured to a threaded rod 86 by a coupling 88. The shaft or rod 86 is axially threaded into a thru hole within one end of an elongated round stock member 90. The opposite end of member 90 is coupled to braces 72, 72 adjacent block 70 by a pivot pin 92. Actuation of reversible motor 84 causes braces 78, 78 to pivot about fastener 76 thus raising or lowering the lower arm frame 30 and hand 32.

A reversible drive motor 94 is secured to a bracket or motor mount 74 which, in turn, is secured for pivotable movement between braces 78, 78 adjacent fastener 76. A coupling 96 connects the motor drive shaft with a threaded shaft 98 which has an end portion threadably received within a threaded, axially extending opening provided in one end of rod 100. The opposite end of rod 100 is secured by a pivot pin 102 to upstanding brackets 80' of the frame 36' of the lower arm 30. Actuation of reversible elbow motor 94 serves to pivot one end of the frame 36' of the lower arm 30 about the lower ends of braces 78, 78 to lower or lift the end of frame 36' having rod 100 fastened thereto. The reversible motors 84 and 94 provide lift and trim for the hand and lower arm.

The frame 36' is substantially identical to frame 36, and extending outwardly of frame 36' is an end portion of shaft 48' having a block 104 secured thereto, block 104 being similar to block 70.

A pair of elongated braces 106, 106 have first end portions fastened to opposite sides of block 104, while the opposite ends of the braces are maintained in spaced parallel relation by a bracket or motor mount 108 (FIG. 12) formed of sheet material and fasteners 110 which permit pivotal displacement of bracket 108 relative to the braces 106, 106. Displacement of the bracket 108 relative to the braces is controlled by a hand motor 112 which, in turn, is supported in a manner similar to motors 84, 94 by a motor mount 74 pivoted upon a pin type fastener 114 which extends between braces 106, 106. Referring to FIG. 5, the motor shaft is secured for rotation with a threaded rod 116 by means of a coupling 118. The end of rod 116 opposite coupling 118 is threadably received within an axially extending bore of a rod 120. The end of rod 120 is pivoted by a fastener 122 to an upstanding flange 124 which forms a portion of mount 108. Thus, motor 112 serves to selectively pivot the hand 32 about fastener 110.

The entire hand 32 including motor 112, braces 106, 106, etc., is supported by shaft 48' which also is capable of 180° rotation by a spiral actuator member 58' and a motor 50' in a manner similar to rotation of shaft 48 in the manner previously described.

Figure 12:
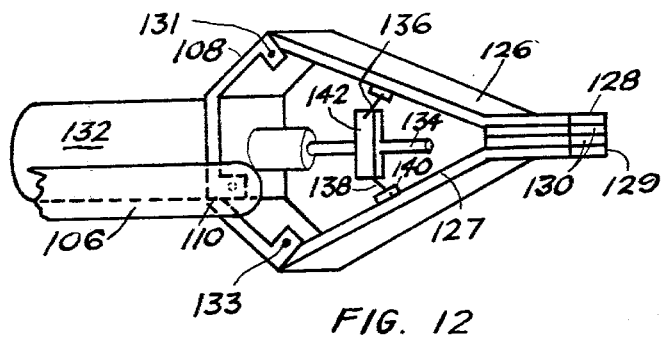
FIG. 12 is an enlarged perspective view of a hand assembly.
Figure 8:
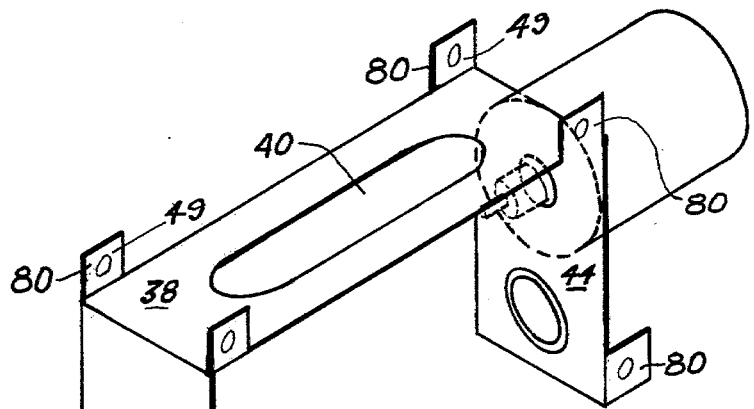
FIG. 8 is an enlarged, perspective view of portions of a support frame for a spiral actuator.

A pair of opposed finger members 126, 127 are pivoted adjacent the ends of mount 108, as shown by FIGS. 5 and 12, in a suitable manner by conventional fasteners 131, 133. The outermost portions 128, 129 of fingers 126, 126 are provided with rubber pads 130 or other suitable means to facilitate the gripping of an article or object therebetween.

A reversible finger motor 132 is mounted upon bracket 108, and the threaded drive shaft 134 extends through an opening in the bracket, as shown by FIG. 12. Opening and closing of the fingers is controlled by a pair of rods or stiff wire members 136, 138. Wires 136 and 138 have first end portions pivotably attached to flanges 140 of fingers 126, 127, while opposite end portions of the wires 136, 138 are pivotably received within openings, or otherwise suitably attached to opposite end portions of an elongated block 142. Block 142 is provided with a threaded bore and is displaceable along a threaded rod 134 to open or close the fingers 126, 127, as desired upon actuation of motor 132.

In a modified embodiment of the base module, the wheels 18, 18 may be independently driven through separate gear boxes 150 and electric motors 152 as shown schematically by FIG. 14. Two casters rather than a single caster, may be provided adjacent the rear corners of the base module to increase the stability of the apparatus.

In a preferred embodiment, substantially the entire arm modules are formed of aluminum or other lightweight materials. The reversible electric drive motors are of the same type, being similar to those used in cordless drills and hand tools, and thus exhibiting power and spped in all actions.

It is also to be noted that the arm modules are self contained and can be mounted in either a left or right hand orientation with the same hardware. Referring to FIGS. 1 and 13, the two arm modules 16, 16 are capable of swinging the hands 32, 32 in two intersecting arcs Y and Z. Thus the hands can cooperate in their tasks while being driven and controlled separately.

FIGS. 2-4 illustrate the results of combining the action of the upper arm motor 84 with the motor 94 at the elbow. The upper motor 84 may provide more lift while the lower motor 94 may be used for trimming action. In addition, the hand motor 112 is capable of tilting the fingers approximately 45° downwardly. When this tilting is combined with the elbow movement afforded by motor 94, the hand can achieve a 90° angle with respect to the floor.

FIGS. 15 and 16 illustrate a modified embodiment of a spiral drive shoulder assembly 34' for rotating an entire arm module approximately 180°. Mounting blocks 160 are secured to the torso module 12 and are provided with bearing for rotatably supporting a shaft 162. The spaced, parallel, elongated braces 72, 72 are fixed to one end of the shaft 162.

The opposite end of shaft 162 is secured in a suitable manner to a tubular member 164 for rotation therewith. The tubular member 164 is received within a sleeve 166 which is fixedly secured with respect to mounting blocks 160. Opposite ends of the sleeve 166 are provided with bearings 168, one of which is shown by FIG. 15, providing for rotation of the tubular member 164 within the sleeve 166.

Tubular member 164 is provided with two spiral slots 170 spaced 180° apart for slidably receiving opposed pins 172. Pins 172 are fixed to and displaceable with a threaded member 174 axially of the sleeve 166 upon rotation of a reversible drive motor 176 and threaded shaft 178. Motor 176 is fixedly mounted with respect to the sleeve 166. As the motor and shaft 178 rotate the pins 172, 172 are displaceable axially of sleeve 166, sliding in slots 170 and elongated, diametrically opposed slots 180. Since pins 172 cannot rotate, axial displacement rotates tubular member 164 within sleeve 166 which, in turn rotates the shaft 162 and braces 72, 72.

A spiral drive arrangement of this type also could be provided for rotating the parallel braces 106, 106 approximately 180°.

I claim:

1. In a mechanical handling apparatus; support means, an articulated arm means, means mounting said articulated arm means upon said support means, said articulated arm means terminating at one end in a hand provided with fingers for grasping and moving an object, said mounting means including a spiral drive assembly for selectively rotating said articulated arm means about a first axis relative to said support means, said spiral drive assembly including an elongated rotatable member having spiral bearing surfaces, drive motor means, means engaging said spiral bearing surfaces and displaceable linearly of said elongated member upon actuation of said drive motor means for rotating said elongated member and said articulated arm means, said articulated arm means including an upper arm assembly secured to said elongated rotatable member, and a lower arm assembly pivotably coupled to said upper arm assembly, means mounting said hand upon said lower arm assembly for pivotable movement relative thereto, and actuator means for selectively pivoting said hand upon said lower arm assembly, for selectively pivoting said lower arm assembly upon said upper arm assembly, and for rotating said hand and lower arm assembly as a unit relative to said upper arm assembly.

2. A mechanical handling apparatus as recited in claim 1, wherein said lower arm assembly pivots about an axis extending within a plane perpendicular to said first axis.

3. A mechanical handling apparatus as recited in claim 1, said actuator means including a spiral drive assembly for rotating said hand relative to said upper arm assembly about a second axis, and a reversible drive motor for pivoting said hand about an axis extending substantially perpendicular to said second axis.

4. A mechanical handling apparatus as recited in claim 1, wherein said support means includes a mobile, driven base.

5. A lightweight, modular mechanical handling apparatus comprising; a base module, a torso module supported upon said base module, first and second arm modules mounted on opposite sides of said torso module in left and right orientation, each of said arm modules terminating in a hand provided with fingers for gripping an object, means mounting each of said arm modules for independent rotation to swing the hands along intersecting arcs for cooperating in performing tasks, and reversible drive means for individually pivoting said hands relative to each other and for opening and closing said gripping fingers, and wherein said first and second arm modules are mounted for rotating about spaced, parallel axes, and each of said first and second arm modules includes an articulated arm means having upper and lower assemblies, and reversible drive means for selectively pivoting and rotating said lower arm assembly relative to said upper arm assembly.

6. A mechanically actuated hand assembly for selectively gripping and moving an object comprising; a frame member, first and second fingers, means pivotably mounting said fingers upon said frame member in opposed relation, actuator means for selectively opening and closing said opposed fingers, said actuator means including a threaded shaft driven by a reversible electric motor, a threaded member mounted for linear movement along said threaded shaft and first and second members pivotably linking said threaded member and each of said opposed fingers, respectively, for pivoting said finger members relative to said frame member, means mounting said motor upon said frame member, and articulate structure for pivotably supporting said frame member, and control means for selectively positioning said articulated structure.

7. A mechanically actuated hand assembly as recited in claim 6, wherein said frame member is of generally U-shaped, lightweight metal construction, and further including means provided on said fingers to facilitate gripping and lifting of an object.

* * * * *